United States Patent Office 2,980,539
Patented Apr. 18, 1961

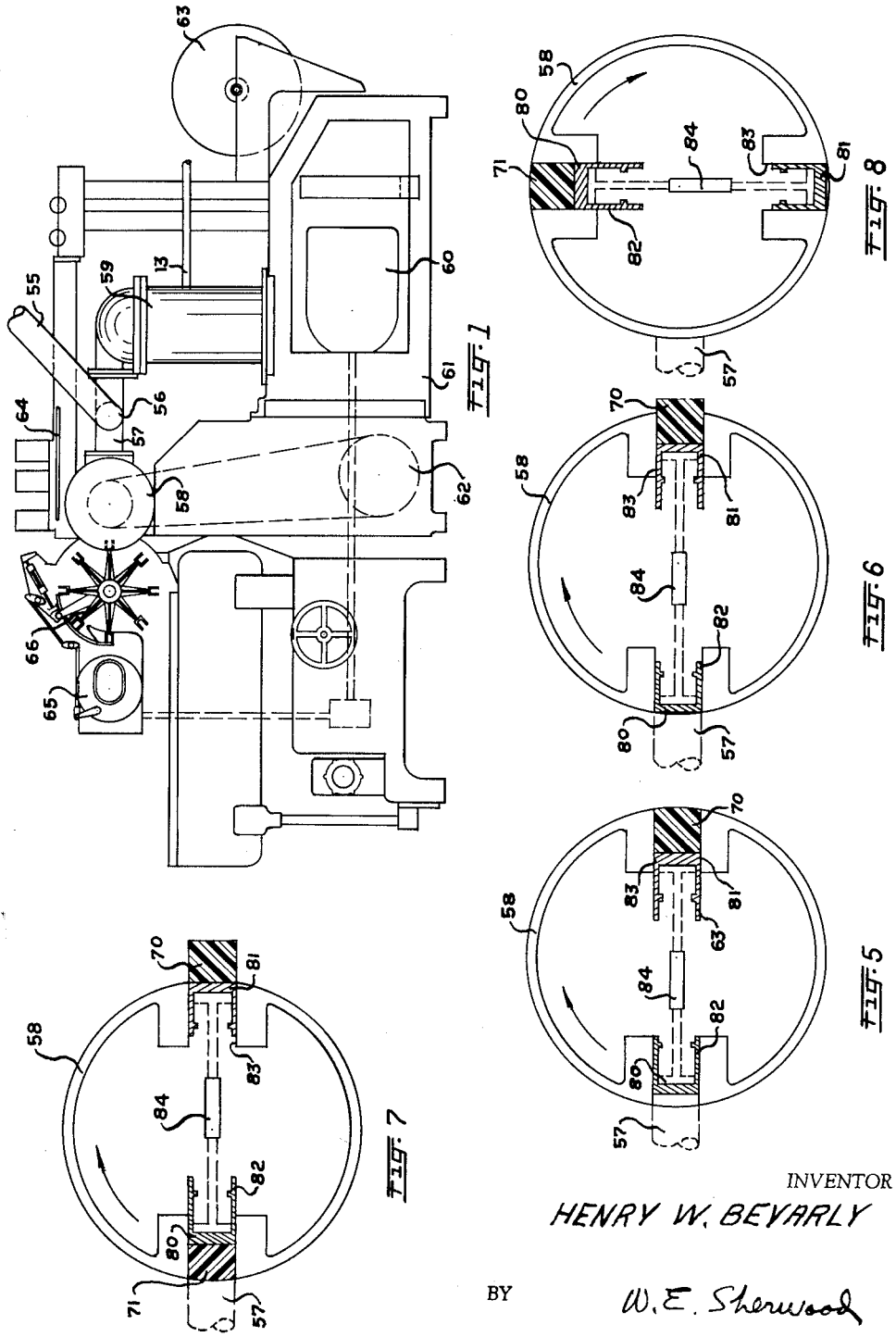

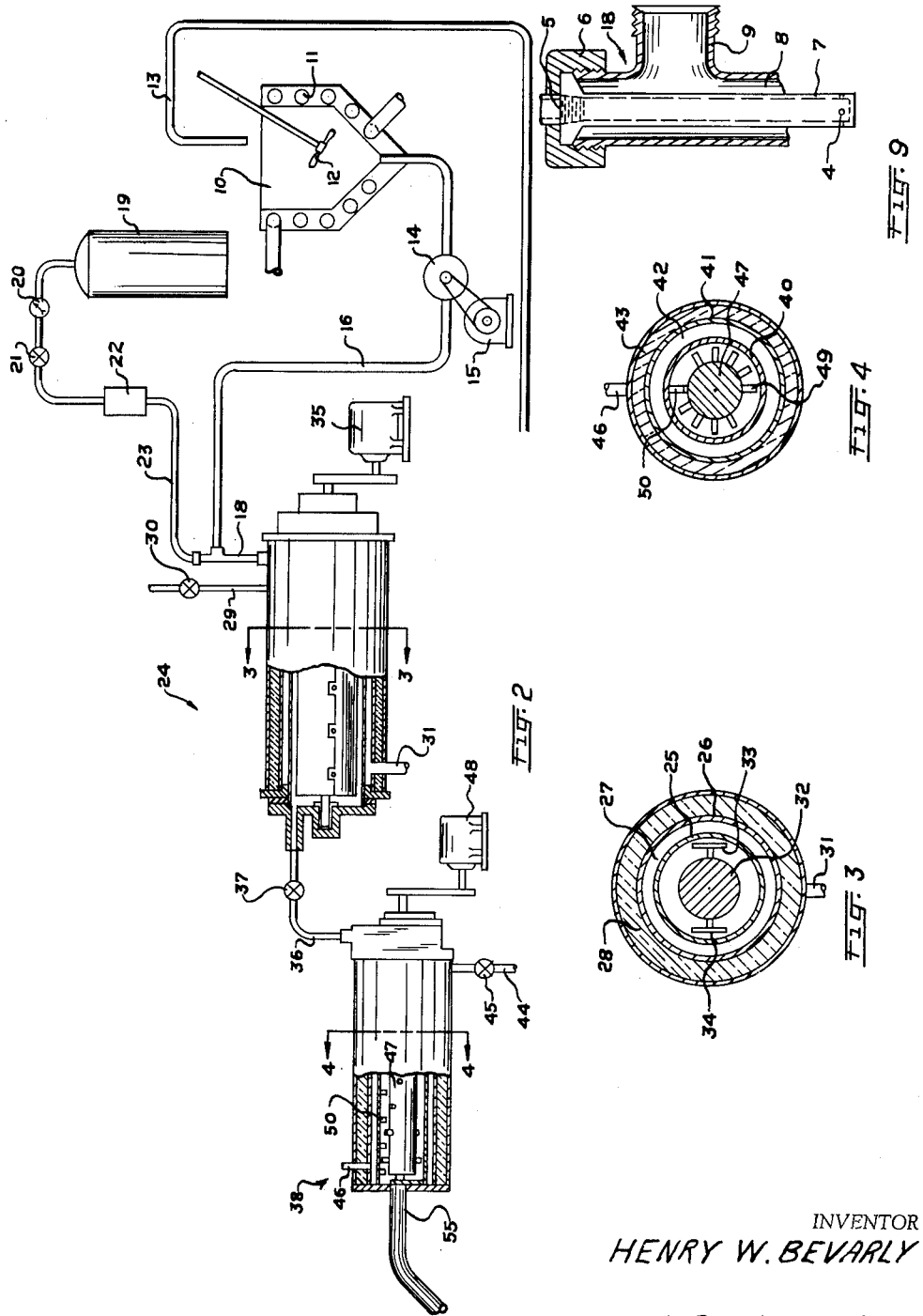

2,980,539
METHOD FOR PRODUCING AND MOLDING PLASTIC MATERIALS HAVING A GASEOUS INGREDIENT

Henry W. Bevarly, Louisville, Ky., assignor to Chemetron Corporation, Chicago, Ill., a corporation of Delaware
Filed June 23, 1958, Ser. No. 743,660
9 Claims. (Cl. 99—118)

This invention relates to an improved method for producing a homogeneous plastic material, one of the ingredients of which is a gas. More particularly, it relates to the production of such a material and to the molding of the produced material into separate prints which are characterized by a substantially uniform weight, uniform and well defined shapes, and reduced shrinkage in size during handling and extended shelf-life. Furthermore, the invention relates to a new and improved method for producing a margarine product.

Various processes have been developed heretofore for the production of plastic culinary materials, such as lard, shortening, margarine, and reconstituted butter, and for plastic non-culinary materials, such as soap, waxes and the like, all of which have in common the presence of a gaseous ingredient. The molding and packaging of such materials likewise is known. However, in general, all such processes have been attended by certain disadvantageous features which it is a purpose of this invention to overcome. In particular, the molding of the plastic material containing gas, hereafter generally designated as aerated material, has presented certain obstinate problems when the material being processed continuously in a high-capacity system under elevated pressures is brought to atmospheric pressure during the packaging of the same. Unless the material is brought to the molding step in a substantially homogeneous condition and is delivered from the molding to the packaging step without undue working of the material, the shaped print of aerated material may shrink in size even though uniform weights of material are dispensed into the packaging apparatus. Moreover, in the production of aerated materials involving the change of form from liquid to plastic states and emulsification of those liquid ingredients, each of the processing steps incorporating, for example, heat exchange, pressure, and agitation, has an interdependent role in the production of the homogeneous product to be delivered to the molding step. To achieve the desired product, therefore, a close and exacting control necessarily must be exerted upon the product during its passage through the continuous process and prior to its delivery to the molding step. It is these and similar problems of known processing of aerated materials which this invention serves to overcome.

For purposes of illustration, the invention is disclosed in connection with the manufacture of margarine, a product generally recognized as requiring specialized processing control. However, it will be understood that the invention, in its broader aspects, is in no way limited to this particular material, but, on the contrary, may be used in the manufacture of many and diverse aerated plastic materials.

One object of the invention is to provide a new and improved method for continuously producing and molding an aerated plastic material.

Another object is to provide an improved method for continuously producing an improved aerated margarine product.

Another object is to provide an improved method for molding an aeraed plastic material delivered to the molding step under superatmospheric pressure so that the molded prints delivered from the molding step into a region of atmospheric pressure are dimensionally and volumetrically stable.

Another object is to provide an improved process for producing a molded unit of aerated plastic material having an improved form-retaining characteristic.

A further object is to provide an improved continuous process for selectively regulating the amount of gas contained in an aerated plastic material whereby sequentially produced individual prints of material have uniform weights and sizes.

A still further object is to provide an improved pressurized process of molding an aerated product in which the product is permitted to expand internally within the molding apparatus and to be discharged at atmospheric pressure without further expansion.

Other features and advantages of the invention will be apparent from the following detailed description read in conjunction with the accompanying drawings which show a presently preferred relationship of apparatus for carrying out the several processing steps in the manufacture of margarine.

Fig. 1 of the drawing is a diagrammatic view of one form of molding and wrapping apparatus suitable for use with the invention, the input conduit for incoming material and a recycle conduit for surplus material being shown in interrupted form;

Fig. 2 is a diagrammatic view of one form of processing apparatus for forming the aerated plastic material, the output conduit for processed material and the input conduit for recycle material corresponding to the conduits shown in Fig. 1;

Fig. 3 is a sectional view to a larger scale taken on line 3—3 of Fig. 2;

Fig. 4 is a sectional view to a larger scale taken on line 4—4 of Fig. 2;

Figs. 5 to 8 are diagrammmatic views showing consecutive steps of molding treatment, by means of a suitable molding apparatus, of the aerated plastic material delivered through the output conduit of the processing apparatus, and Fig. 9 is an elevation view, partly broken away, of a mixing fitting.

According to the invention, there is provided a system in which liquid and gaseous ingredients are suppplied under a carefully regulated control into an apparatus in which those ingredients are subjected simultaneously to carefully controlled heat exchange, agitation, and superatmospheric pressure, meanwhile moving continuously through that apparatus into a molding step. Upon reaching the molding step, the product which now is in the form of an aerated plastic under superatmospheric pressure, is subdivided into prints or units of a predetermined weight and is permitted to expand to a predetermined size and shape, meanwhile having the pressure thereon reduced to atmospheric pressure. Upon attainment of its predetermined size and shape at atmospheric pressure, the print of aerated plastic material is delivered from the molding step to any suitable phase of handling conducted under atmospheric pressure, as, for example, a take-off conveyor, a wrapping means, or the like.

Referring now to Fig. 2, and considering the invention in its application to the production and molding of margarine, there is provided a battery of suitable premixing tanks, one such tank being shown at 10, and in which the liquid ingredients of the margarine product, for example, hydrogenated vegetable oils, milk, and water, may be mixed in predetermined proportions according to the given formula of the product. In this same tank any desired supplementary materials such as salt, coloring agents and the like, may conveniently be introduced, as desired. Tank 10 may be equipped with heating or cooling coils 11 and has a suitable agitator 12 driven by any suitable means. Leading into the tank is a recycle conduit 13 for a purpose later to become apparent.

From the premixing tank the mixed ingredients are then pumped by means of pump 14, driven by any suitably controlled motor 15, into conduit 16, and under a relatively high pressure, for example, in the order of 300 pounds per square inch gauge. Depending upon the particular formula and the amount of heating given to the ingredients in the premixing tank, the mixed ingredients may be given additional heating after leaving the pump, or may be passed directly into the inlet fitting 18 leading to the chilling apparatus.

As an important feature of the invention, there is introduced into the premixed ingredients prior to their chilling step, a predetermined amount of a gaseous ingredient which will provided in the final product, after its molding, the desired amount of gas which assures in that final product its characteristic texture, smoothness, appearance and density. This gaseous ingredient which may comprise air, nitrogen, or other gas, is supplied under a high pressure, for example, in the order of 400 p.s.i.g., from a tank or other source 19 equipped with a pressure gauge 20, a control valve 21 and a metering device, such as a rotameter 22. The metered gas flows through a branch conduit 23 into a fitting 18 comprising a gas diffusion unit mounted in a T-like structure which is located at the inlet end of the chilling apparatus 24. As best seen in Fig. 9, the premixed ingredients delivered by conduit 16 enter a side connection 9 of the fitting and then move toward the chilling apparatus through the annular space 8 surrounding one end of the hollow tube 7 in that fitting. This tube is suitably affixed at its other end upon the fitting body by means of a removable nut 6 having an aperture 5 therein communicating with branch conduit 23. Adjacent its one end, the hollow tube is provided with a series of small apertures 4, for example, about six holes each one-sixteenth inch in diameter, through which the gas passes in the form of small bubbles which are relatively uniformly mixed with the material flowing through annular space 8. Thus, the ingredients to be found in the final product are delivered to the inlet of the chilling apparatus, generally designated 24, at a predetermined pressure and temperature, for example, at about 300 p.s.i.g. and 108° F. and with the gas uniformly dispersed in the mixed material. This chilling apparatus preferably is of the type having an elongated stationary cylindrical wall 25 defining a processing chamber and encompassed by a jacket 26 to provide an annular space 27 through which a suitable cooling fluid may be circulated for the purpose of removing heat from the materials passing through the apparatus. Suitable insulation 28 may surround the jacket and the cooling medium may be supplied through a conduit 29 controlled by valve 30 and located adjacent one end of the apparatus. Adjacent the other end of the apparatus a conduit 31 is located thus to effect a passage of the heat exchange medium through space 27 in contact with the cylindrical wall 25.

Within the processing chamber a rotatable agitator shaft 32 provided with suitable scraper blades, here shown at 33 and 34, is mounted and is driven from one end of the chamber as by the motor 35 whose speed can be selectively controlled. The chilling apparatus 24 is preferably of the general type disclosed in U.S. Patent No. 2,013,025 wherein a rapid extraction of the heat from the material under treatment will be obtained with concurrent agitation of material, resulting in the material becoming supercooled even while remaining in liquid form with bubbles of gas therethrough. After passing through the apparatus 24 under pressure and subject to such chilling and agitation, the emulsified material then moves into conduit 36 through an adjustable back-pressure valve 37. At this time, the emulsified material entering conduit 36 downstream of the back-pressure valve may have a temperature of about 40° F. and be under a pressure of about 120 p.s.i.g. but meanwhile retaining its physical form of a supercooled liquid with small bubbles of gas dispersed therein.

The material then flows from conduit 36 into the inlet end of a suitable tempering apparatus generally designated 38. This tempering apparatus may conveniently comprise an elongated stationary cylindrical wall 40 defining a processing chamber and encompassed by a jacket 41 to provide an annular space 42 through which a suitable heating fluid may be circulated, when required by the formula of the material under treatment. Suitable insulation 43 may surround the jacket and the heating medium may be supplied to the jacket as required, through a conduit 44 controlled by a valve 45 and located adjacent one end of the tempering appartus. Adjacent the other end of the apparatus, a conduit 46 is connected to the jacket, thus to effect a passage of the heat exchange medium through space 42 in contact with the cylindrical wall 40.

Within the tempering apparatus 38 a rotatable agitation shaft 47 driven from one end of the chamber by a suitably controlled motor 48, is provided. Thorough mixing or blending of the product passing through the apparatus is accomplished by a series of pins 49 arranged in a helical pattern on the shaft 47 which cooperate with a row of similar stationary pins 50 mounted on the inner surface of wall 40, these latter pins conveniently being arranged in a single axial plane. While passing through the apparatus 38 certain significant physical changes occur in the margarine material as indicated by the following specific example of one particular product and which may prove helpful in fully appreciating the invention:

Example A

A conventional margarine stock was continuously supplied to the tempering apparatus 38 at a rate of 1040 pounds per hours. This stock had the following approximate composition:

| | Parts by weight |
|---|---|
| Selectively hydrogenated vegetable oil | 2600 |
| Skimmed milk | 530 |
| Salt | 100 |
| Emulsifier (40–50% mono- and di-glycerides) | 5 |
| Lecithin | 5 |
| Yellow food coloring | 2 |

Upon entering the apparatus the stock was in liquid super-cooled condition having small bubbles of gas dispersed therethrough and was at a temperature of 40° F. and under a pressure of 120 p.s.i.g. The apparatus comprised a cylinder 40 having an inner diameter of 3 inches and a length of 12 inches, no heat exchange medium being supplied thereto. The outer diameter of shaft 47 was 1¾ inches, the diameter of pins 49 and 50 was ¼ inch and the spacing of such pins longitudinally of the shaft and cylinder was on ¾ inch centers. The shaft 47 was driven at 2050 r.p.m. While passing through the apparatus, the material increased in temperature from 40° F. to 46° F. due to heat of crystallization and emerged from the apparatus as a plastic material and at a pressure of 75 p.s.i.g. As the small gas bubbles expanded during the setting up or crystallizing of the supercooled emulsified liquids, they were broken up by the action of the relatively moving pins and reformed into small uniformly dispersed, gaseous interstices within the matrix of plastic material. No substantial pumping action which might have caused over-working of the product was exerted by the agitator shaft 47, the pressure forcing the material through the tempering apparatus being provided substantially exclusively by the pump 14 of the continuous system. The product emerging from the apparatus and later molded, was characterized by its homogeneous nature, its lack of "weeping" and "slipperyness," and its smooth texture and uniform "butter-like" appearance with exceptionally good spreadability.

Upon leaving the tempering apparatus, the material in its plastic condition moves through conduit 55 into a molding apparatus of the general type more fully disclosed in the co-pending application of Henry W. Bevarly, Walter F. Whitson and Carl C. Yann, Serial No. 585,737, filed May 18, 1956, and issued as U.S. Patent 2,895,271 on July 21, 1959. As will be seen, conduit 55 is larger in diameter than conduit 36, thus to accommodate the expanded volume of material. Referring now to Fig. 1, conduit 55 leads into a header 56 serving as an accumulation zone for the material continuously passing thereto and communicating at one side with a plurality of branch conduits, one being shown at 57, and serving as inlets to a rotatable mold head 58. At another side the header communicates with a compensator apparatus 59 having a suitable conventional movable piston (not shown) therein and which piston is constantly subjected on one face to the pressure of the plastic material delivered into header 56 and on its other face to a suitable backing pressure medium such as air maintained at a predetermined pressure, for example, 30 p.s.i.g. When forced inward against such backing pressure, the piston uncovers a conventional recycling port permitting excess material to flow into recycle conduit 13 for delivery to tank 10 for reuse. As fluctuations of flow into the molding compartments occur, the piston serves to prevent voids in the plastic material delivered to these compartments and the compensator has a capacity sufficient to handle the material delivered into header 56 and temporarily not discharged into the molding head, all as disclosed by said Patent No. 2,895,271. A motor 60 mounted upon a framework 61 serves to drive a Ferguson roller gear drive 62 which actuates the rotatable molding head 58. The motor 60 may also actuate the enwrapment supply means, indicated by the supply roll 63 and the shaft 64 for driving suitable enwrapment advancing and severing means. Moreover, the motor 60 may also actuate through suitable gear boxes, a Geneva gear 65, or equivalent means, adapted to drive a series of wrapping wheels corresponding to the number of pairs of molding compartments employed, one such wheel being shown at 66. These several driving arrangements are fully disclosed in Patent No. 2,895,271 and, as such, form no novel portion of the present invention.

Considering now Figs. 5 to 8 in which there is shown diagrammatically four distinct stages of molding of the improved plastic material, it will be noted that the molding head 58 is rotated with its periphery in close contact with the branch inlet conduit 57. Contained within the molding head is a pair of suitably linked mold blocks 80 and 81 reciprocable, respectively, in mold cylinders 82 and 83 disposed on diametrically opposite sides of the cylindrical molding head. Any suitable coupling means, generally indicated at 84 may be provided to releasably couple the pistons together and suitable stops (not shown) may be provided to limit inward movement of those pistons in their cylinders. As shown in said Patent No. 2,895,271, means for adjusting the inward displacement of the pistons to vary the size of print being molded may also be provided. The particular coupling means employed may be of any conventional type and may include suitable mechanical variable linkages, pressure fluid and vacuum actuated arrangements, solenoid arrangements, or the like.

It will be further understood that in accordance with the said Patent No. 2,895,271, the number of such pairs of mold blocks, all of which receive their material from the header 56, corresponds to the number of molding wheels 66 driven in timed sequence with the molding head.

Considering now Fig. 5, the molding step of the process may be conducted upon the above described margarine material in the following manner. As the material is delivered from conduit 55 at a temperature of about 50° F. and a pressure of about 75 p.s.i.g., it enters header 56 and fills the space above the piston in the compensator 59 maintaining a commensurate pressure upon that piston. However, since plastic material is intermittently withdrawn from any given branch inlet 57 into any given pair of mold compartments, the average pressure in any such inlet is about 35 p.s.i.g. Thus, a major step in bringing the plastic material from its elevated pressure to its final atmospheric pressure is accomplished within the confines of the closed system prior to entry into the molding compartment. This internal reduction of pressure is accomplished, moreover, without agitation of the plastic mass and involves merely a swelling action which does not adversely affect the texture of the final product.

Upon register of the mold compartment 82 with the inlet branch conduit 57, the coupled mold block 80 is fully extended and its coupled companion mold block 81 is fully retracted, the print 70 of plastic material in the mold compartment 83 being at atmospheric pressure due to the previous cycle of movement of the respective mold blocks, in the manner later to appear. Following register of mold block 80 with branch conduit 57 the mold block 80 is uncoupled and pressure of the incoming material is permitted to move mold block 80 inwardly a distance corresponding to the difference between the inward displacement of that block when retaining the molded print at atmospheric pressure and the inward displacement thereof when retaining a molded print at a pressure corresponding to the pressure in the branch conduit 57. During this initial movement of block 80, its companion block 81 remains at rest and is uncoupled from block 80. Following this stage, the two blocks 80 and 81 are forced outwardly an equal distance by the coupling means 84 until mold block 80 is again at its outermost extended position, as seen in Fig. 6. Thereupon, the two blocks are coupled together to move as a unit.

During this coupling operation, as will be noted in Fig. 6, the print 70 at atmospheric pressure is slightly extended from its mold compartment and is in position to enter a wrapping receptacle of wheel 66 which receptacle has an enwrapment positioned therein, all as shown in said Patent No. 2,895,271. Following this coupling of the mold blocks, the pressure of the plastic material in branch conduit 57 moves the blocks as a unit into the position shown in Fig. 7. When this is accomplished, the previously molded block 70 at atmospheric pressure is carried away by the wrapping wheel and the newly molded block 71 under the pressure found in conduit 57, for example, 35 p.s.i.g., is ready for further molding treatment.

Referring now to Fig. 8, the molding head 58 is rotated to bring mold compartment 82 out of register with branch conduit 57 and the mold blocks 80 and 81 are uncoupled from each other. Upon this uncoupling, the internal pressure within the print of material 71, either alone or in conjunction with a supplemental force applied to mold block 80 by the coupling means 84, retracts the mold block to an inner position increasing the volume in the mold compartment and permitting the print 71 to swell and the pressure thereon to be reduced to atmospheric pressure. This swelling of the material and constant reduction of pressure takes place without agitation of the material and without adversely affecting its texture. Accordingly, by the time the compartment 82 uncovers the outlet in the casing surrounding the molding head 58, the print 71 is fully expanded and does not tend to extrude outwardly as that casing outlet is uncovered. The period of time during which the print 71 remains in the mold compartment also is sufficiently long to permit the plastic material to acquire a substantial form-retaining rigidity at room temperature. Thus, the shape of the molded, relatively rigid, print is in no way deformed upon reaching its discharge position. Moreover, prior to the mold compartment reaching this outlet, the coupling means again couples mold blocks 80 and 81 together. As mold compartment 82 registers with its discharge outlet, the companion mold compartment 81 then registers with the branch conduit 57, whereupon the previously described cycle of molding and discharging operations takes place as a new cycle.

The print 70 or 71, as thus produced, has a sharply defined, form-retaining shape. The plastic material in the print forms a matrix in which the minute gas bubbles are evenly distributed and normal handling and storage of such a print does not cause a migration of those minute gas bubbles to the surface of the print. Thus, shrinkage of the molded print is at a minimum even following an extended period of shelf-life. In addition, since the homogeneous material delivered to the molder is of a uniform density and pressure, and the molder blocks travel a predetermined distance in permitting the internal swelling of the material, prints of uniform weight are produced.

The invention is well suited for handling a wide variety of formulas of margarine merely by making suitable adjustments or modifications of the apparatus. For example, in those instances where a long "set-up" time for the product is desired, the print 70 leaving the rotatable mold apparatus may first be received in a stationary open-sided elongated box interposed between the mold head 58 and the wrapping wheel 66 and forming a holding zone detention space. Such a box may be of a size and shape so that the print upon leaving the mold head is allowed to rest in the box for one cycle of the molding operation prior to being forced into the wrapping wheel by the succeeding print emerging from that mold head.

Having the foregoing in mind, it now will be seen that the invention not only provides for a continuous process of producing the plastic material under an elevated pressure, but also the molding thereof and the dispensing of the molded prints at atmospheric pressure. The swelling of the processed material within the molding compartments may amount to as much as a 40–50% increase in volume, but this is accomplished without mechanical working of the material and without degradation of its quality as determined by the prior processing steps which were closely controlled. Such steps involving heat exchange, mechanical agitation, and pressure conditions, may be readily governed within close limits by conventional control means.

Whereas, there has been set forth in the foregoing description a method for producing and molding an improved margarine product and additionally an illustration of specific temperatures, pressures and mechanical agitation conditions, it will be understood that such are included for purposes of illustration and not of limitation. Various types of aerated plastic materials processed under entirely different temperatures, pressures and agitation conditions may be produced without departing from the invention, the scope of which is intended to be commensurate with the following claims.

What is claimed is:

1. A method for preparing plastic material having a gaseous ingredient and forming therefrom accurately sized prints of uniform weight comprising, mixing under a controlled elevated pressure an aerated mixture of material ingredients including a volume of gas commensurate with a predetermined specific gravity of the final print at atmospheric pressure, flowing a portion of said aerated mixture under an elevated pressure into a molding apparatus and permitting said portion to undergo a first expansion and to reach an intermediate and lower pressure prior to segregation of said portion from the remainder of said mixture, and segregating said portion and permitting said segregated portion to undergo a second expansion and to reach substantially atmospheric pressure in the form of an accurately sized print having said predetermined specific gravity, said second expansion occurring while said portion is out of communication with the atmosphere whereby the shape of said print acquired during said second expansion may remain substantially unchanged when said print is discharged from its molding treatment.

2. The method of claim 1 wherein said first and second expansions constitute internal expansions inherently generated by said material and resulting in a substantially homogeneous expanded material.

3. A method for preparing plastic material having a gaseous ingredient and forming therefrom accurately sized prints of uniform weight comprising, mixing under a first controlled elevated pressure in a first mixing step the liquid and gaseous ingredients of said material including a volume of gas commensurate with a predetermined specific gravity of the final print at atmospheric pressure, passing the aerated mixture to a second mixing step and continuing the mixing therein under a second controlled elevated pressure while permitting the material to acquire a plastic form having finely subdivided gas bubbles uniformly distributed therethrough and held in a matrix of plastic material, flowing a portion of said plastic material from said second mixing step under an elevated pressure into a molding apparatus and permitting said portion to undergo a first expansion and to reach an intermediate and lower pressure prior to segregation of said portion from the remainder of said plastic material, and segregating said portion and permitting said segregated portion to undergo a second expansion and to reach substantially atmospheric pressure in the form of an accurately sized print having said predetermined specific gravity, said second expansion occurring while said portion is out of communication with the atmosphere whereby the shape of said print acquired during said second expansion may remain substantially unchanged when said print is discharged from its molding treatment.

4. The method of claim 3 wherein said first controlled elevated pressure is higher then said second controlled elevated pressure.

5. The method of claim 3 wherein heat is removed from said ingredients during said first mixing step.

6. The method of claim 3 including, employing the movement of a subsequent portion of said material into said molding apparatus to cause ejection of a previously molded print from said apparatus.

7. A method for preparing plastic material having a gaseous ingredient and forming therefrom accurately sized prints of uniform weight comprising, continuously premixing the liquid and gaseous ingredients of said material including a volume of gas commensurate with a predetermined specific gravity of the final print at atmospheric pressure, continuously supplying the premixed material to a first mixing step maintained at a first controlled elevated pressure, removing heat from the material while passing through said first mixing step continuously to a second mixing step and continuing the mixing therein under a second controlled elevated pressure while permitting the material to acquire a plastic form having finely subdivided gas bubbles uniformly distributed therethrough and held in a matrix of plastic material, continuously flowing material from said second mixing step under an elevated pressure into an accumulation zone, intermittently flowing portions of said accumulated material into a molding apparatus and permitting said portions to undergo a first expansion and to reach an intermediate and lower pressure prior to segregation of said portions from the remainder of the plastic material in said accumulation zone, and intermittently segregating said portions and permitting said segregated portions to reach substantially atmospheric pressure in said molding apparatus in the form of an accurately sized print having said predetermined specific gravity, said segregated portions remaining out of communication with the atmosphere during their retention in said molding apparatus preparatory to discharge therefrom whereby the shape of said print acquired while in said molding apparatus may remain substantially unchanged when said print is discharged from its molding treatment.

8. A process for molding accurately sized prints of aerated material of uniform weight, which process comprises: forming under controlled pressure an aerated mixture containing a controlled and predetermined ratio of gaseous to non-gaseous ingredients, intermittently allowing increments of said mixture to flow under the influence of said controlled pressure into a mold cavity of predetermined volume, moving said mold cavity out of communication with the source of the aerated mixture, then moving a wall of said cavity to increase the volume thereof to a second predetermined volume and thereby permitting expansion of the aerated material in said mold cavity, said expansion being accompanied by a decrease in pressure from said controlled pressure to a pressure close to atmospheric, holding the expanded material in said mold cavity for a short interval of time to permit the expanded material to set, and finally ejecting the solidified print from said mold cavity into a region of atmospheric pressure.

9. A continuous process for forming an aerated emulsion having an oleaginous phase, an aqueous phase and a gaseous phase into shaped portions suitable for immediate wrapping, which process comprises: forming a non-emulsified mixture of oil and water at a temperature above the melting point of the oil, applying a pressure of at least about 300 pounds per square inch to said mixture and conducting the mixture through a cooling zone, introducing a gas into said mixture passing through said cooling zone at a pressure at least as great as the pressure applied to said mixture and at a controlled rate with respect to the rate at which said mixture is conducted through said zone, agitating said mixture and said gas in said cooling zone while abstracting heat therefrom to reduce the temperature thereof to about 40–50° F., thereby forming an emulsion of the mixture having bubbles of said gas dispersed therein, subjecting the chilled mixture to additional violent agitation by flowing the same while still under elevated pressure through an agitation zone to reduce the size of said gas bubbles by subdivision thereof, introducing the thus treated mixture under pressure into a mold cavity of predetermined volume, moving a wall of the mold cavity to increase the volume thereof to a second larger predetermined volume permitting expansion of the minute gas bubbles in the emulsion as the pressure is reduced, due to movement of the wall, from a pressure of about 30–40 pounds per square inch to about atmospheric, holding the material in said mold cavity for a short interval of time sufficient for the aerated mixture to become rigid, and ejecting the shaped portion from said mold cavity into the atmosphere in the desired condition suitable for immediate wrapping.

References Cited in the file of this patent

UNITED STATES PATENTS

| | | |
|---|---|---|
| 1,783,867 | Vogt | Dec. 2, 1930 |
| 2,287,193 | Overstreet | June 23, 1942 |
| 2,576,318 | Toulmin | Nov. 27, 1951 |
| 2,882,165 | Dalziel et al. | Apr. 14, 1959 |